May 22, 1956  W. H. CARPENTER  2,746,272
METHOD FOR HOLDING SHRIMP
Filed July 24, 1952  2 Sheets-Sheet 1

Inventor:
Walter H. Carpenter
By Wilmer Mechlin
his Attorney

May 22, 1956     W. H. CARPENTER     2,746,272
METHOD FOR HOLDING SHRIMP
Filed July 24, 1952     2 Sheets-Sheet 2

Inventor:
Walter H. Carpenter
By Wilmer Mechlin
his Attorney

United States Patent Office

2,746,272
Patented May 22, 1956

2,746,272

METHOD FOR HOLDING SHRIMP

Walter H. Carpenter, Savannah, Ga.

Application July 24, 1952, Serial No. 300,742

1 Claim. (Cl. 62—170)

This invention relates to refrigerating systems of the liquid coolant type for keeping fish and like perishables and to a method of keeping fish using such systems.

The primary object of the present invention is to provide an improved refrigerating system and method employing a liquid coolant which is highly efficient in operation and relatively inexpensive in installation and maintenance.

Another object of the invention is to provide an improved refrigerating method for holding the catch of a fishing vessel in which the catch is stored for the duration of the voyage in chilled brine-containing tanks, the brine serving both as the coolant and to buoyantly support the catch, thus to ensure uniform refrigeration and prevent crushing.

An additional object of the invention is to provide an improved refrigerating method for holding shrimp in which the catch is stored for the duration of the voyage in brine in insulated tanks and the brine is chilled outside and circulated through the tanks, whereby the shrimp is maintained at a uniform temperature sufficiently low to prevent black-spotting and other spoilage.

A further object of the invention is to provide an improved refrigerating system for holding the catch of a fishing vessel wherein the exterior chiller by which the circulating brine coolant is maintained at a uniform refrigerating temperature is operated from the boat's propulsion unit by an hydraulic pump and motor unit so as to eliminate the necessity for electrical wiring.

Other objects and advantages of the invention will appear hereinafter in the detailed description and be particularly pointed out in the appended claim, and illustrated in the accompanying drawings, in which:

Figure 1 is a side elevational view, somewhat schematic, of a refrigerating system embodying the present invention, showing its installation in a shrimp boat.

Figure 4:
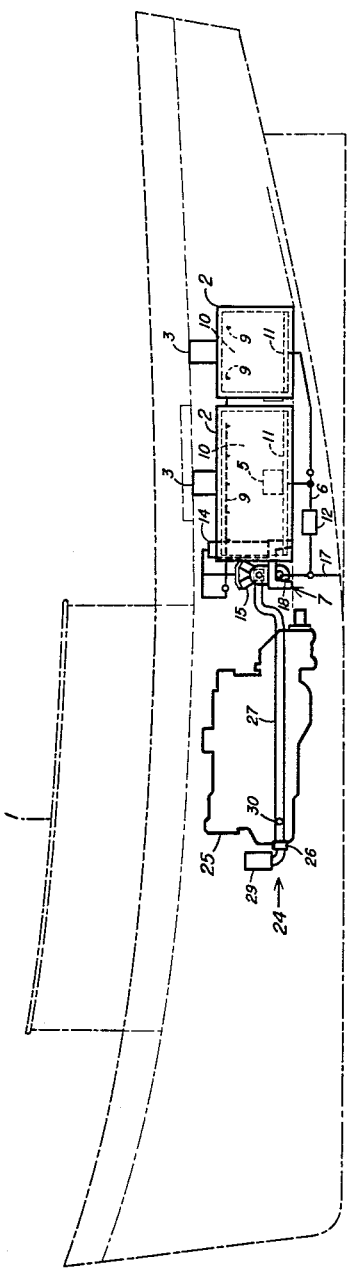
Figure 2:
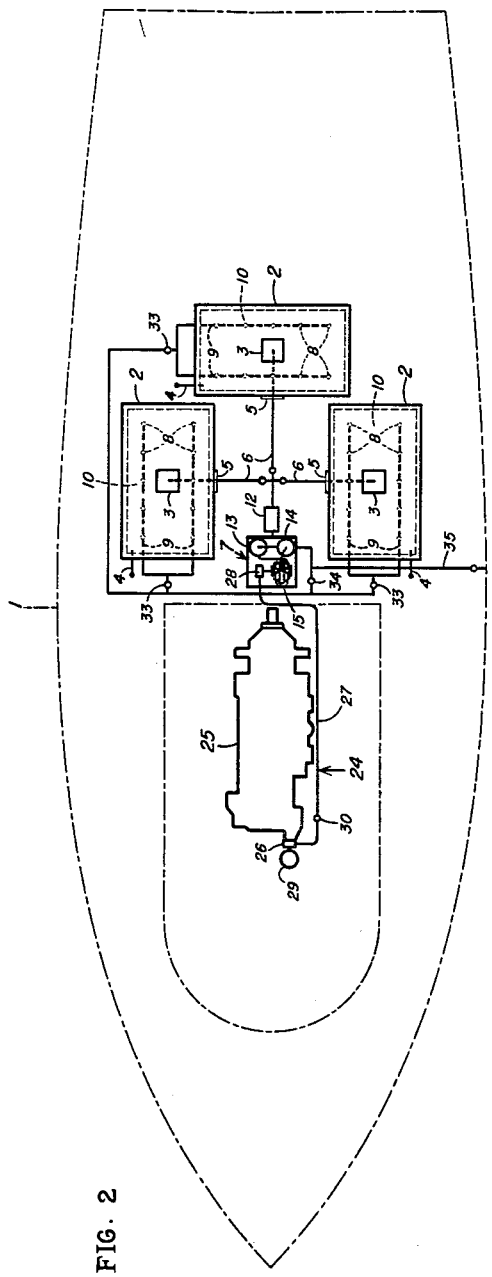
Figure 2 is a plan view of the system of Figure 1.

Except on extremely short trips, the fishing industry, in general, is confronted with the problem of protecting its catch against spoilage and a like problem exists in transporting the catch unloaded from a fishing vessel from the dock to the point where it is processed or consumed. While common to the fishing industry, this problem in recent years has become particularly acute in shrimp fishing, and the application of the improved system to the holding of shrimp on a shrimp boat has therefore been selected for purposes of illustration.

The acuteness of the problem on a shrimp boat in keeping its catch in fresh condition is readily perceived when it is recalled that until about seven years ago such fishing was limited to nearby grounds and a shrimp boat was seldom out of port more than a day at a time. However, with the opening up of new and more distant shrimping grounds, especially in the past seven years, the length of time that the boats remained at sea has greatly increased, so that trips of 10 to 15 days are now quite normal and of as much as 3 to 4 weeks are not unusual.

The increase in the duration of the stay away from port has increased correspondingly the problem of bringing the shrimp to the unloading dock in fresh condition. The general practice has been to "ice" the catch with the ice and shrimp arranged in layers in barrels or other containers. This practice is objectionable not only because of the cost and weight of the ice and the storage space it requires, but because it has proved to be a relatively ineffective preservative, particularly on extended trips. Another objection to "icing" is that part of the catch, and especially the shrimp in the lower layers, are usually crushed by the excessive weight to which they are subjected.

Even as a preservative, ice has not proved too satisfactory. A liability of shrimp fishing is the tendency of the catch to develop "black-spot." This phenomenon, observable as black spots on the bodies of the shrimp and due, apparently, to enzyme action which is accelerated if the shrimp are not headed, does not impair the edibility of the shrimp but has met with such consumer resistance that the affected shrimp are almost a total loss. While icing retards "black-spot," it does not prevent it, with the result that the losses from this cause are fairly high even on normal trips and increase rapidly on trips of longer duration. The apparent solution is mechanical refrigeration, but for vessels of the size of shrimp boats (about 60 ft. o. a. on the average) the available systems are too costly and with their complex electrical controls, too difficult to maintain.

Referring now in detail to the drawings, illustrating a preferred embodiment of the invention and in which like reference characters designate like parts, the improved refrigerating system of the present invention has been shown in its installed position in a fishing vessel 1 of the shrimp boat type, the latter being indicated in outline.

As is customary in fishing vessels, the catch is stored in the hold of the boat and in the present system is held in one or more insulated storage tanks or compartments 2 into which the shrimp is dumped or loaded through a loading hatch or cover 3. As an effective and readily available medium, the coolant with which each tank is charged is sea water, either raw or with salt added, depending on the desired freezing point, both hereinafter being termed "brine." The tank may be filled full but the brine content is preferably held below this level to provide an air space in the upper part of the tank for the purpose to be hereinafter described. To maintain the brine at this level as the tank is loaded with shrimp, there is provided an overflow line 4 through which the excess brine is displaced overboard. Shrimp is loaded into the tank through the loading hatch or cover 3 and for unloading the shrimp at the end of a trip the tank may have a side-opening unloading door or hatch 5 through which the shrimp can be removed after the brine has been drained off.

In the conventional mechanically refrigerated container the Freon, ammonia or other refrigerant is pumped or circulated into the container and cools through cooling coils within the container, normally relying on convection to circulate the cold. The interiors of such tanks are coldest at the coils and require a very substantial temperature differential between the refrigerant and the coolant to maintain the latter at a given temperature. Shrimp has been found to keep best in brine at temperatures of from 28° to 35° F. and to obtain this temperature in the conventional coil type tank would require the refrigerant to be maintained at about 10° F. Since at such a low temperautre sea water would immediately freeze on the coils and progressively reduce the efficiency of refrigeration, it could only be used by the addition of sufficient salt to reduce the freezing point of the solution to or below the temperature of the refrigerant. By contrast, the improved system of the present invention enables the temperature differential between refrigerant and brine to be drastically reduced, with corresponding reduction or elimination of the amount of salt needed to be added. It also distributes the cold effectively so that the entire interior of the tank is maintained at a substantially uniform temperature. This result it accomplishes by utilizing a chiller exterior of the tank and continuously circulating the brine through the tank and chiller, so that the brine within the tank serves as both the refrigerant and the coolant.

To the above end the brine is continuously drawn from the bottom of each insulated tank through an outlet or discharge pipe 6 and passed exterior, or outside, of the tank through a chiller or refrigerating unit 7. The brine preferably is returned to the tank as a spray through nozzles 8 on one or more header pipes 9 which are positioned or disposed in the aforementioned air space in the upper part of the interior or refrigerating compartment 10 of the tank, the chilled brine thus readily admixing with and distributing its cold uniformly over the brine within the tank. To prevent the chiller from becoming clogged with shrimp or shrimp particles, the tank 2 is double-bottomed and provided above the outlet to the discharge pipe with a perforated plate 11 having perforations sufficiently small to screen out whole shrimp and large particles. Any remaining particles are removed by a strainer 12 positioned in the discharge line between the tank and the chiller.

Figure 3:
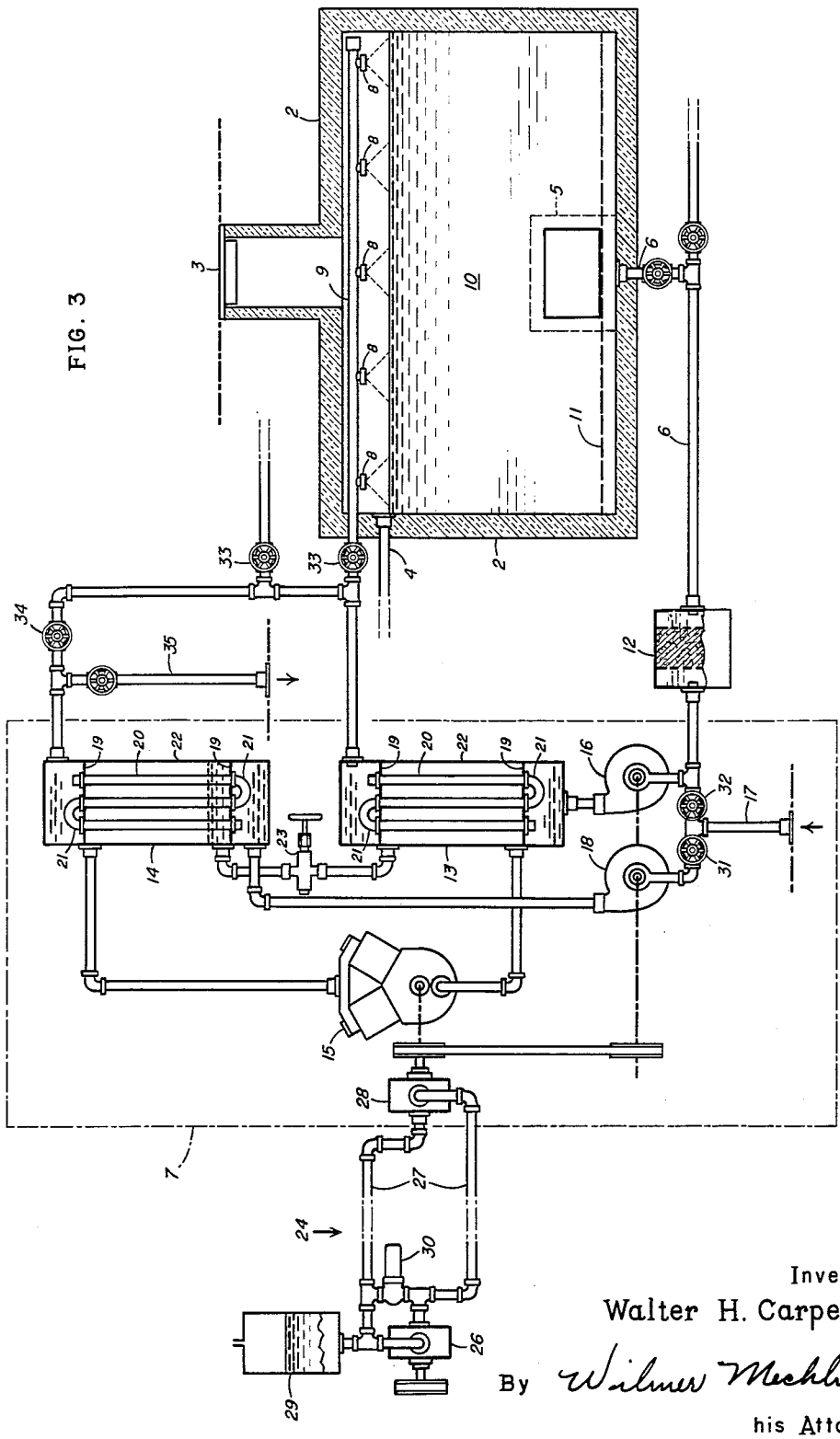
Figure 3 is a fragmentary side elevational view on an enlarged scale of the refrigerating system, the system being shown in part schematically and in part in section.

The chiller 7, the details of which are shown in Figure 3, is comprised of an evaporator 13, a condenser 14 and a compressor 15. The brine from the tank 2 is pumped from the tank through the evaporator 13 and back to the tank by a centrifugal pump 16. The Freon or other refrigerant, compressed in the compressor 15, is condensed in the condenser 14 by raw sea water pumped into the boat from a below water line intake 17 by a second centrifugal pump 18. For minimizing corrosion by the brine or raw sea water, the evaporator 13 and condenser 14 are preferably of shell and tube construction with the corrosive liquid in each confined to tubes of corrosion-resistant material and the relatively innocuous refrigerant passing between the tubes and the shell. It is also preferred that the evaporator and condenser be of the multi-pass type for maximum heat transfer. Illustrated schematically in the drawings, the evaporator and condenser each has a pair of spaced headers 19, mounting a plurality of axially disposed tubes 20 of stainless steel, Monel metal or like corrosion-resistant material. The tubes are connected in the brine or sea water line for the evaporator or condenser, respectively, and are arranged for successive passes of the liquid, this being obtained by connecting the ends of succeeding tubes by the U-tubes 21 or correspondingly compartmenting the ends of the shells 22 beyond the headers 19. To facilitate cleaning, as will be periodically required, particularly of the tubes in the evaporator, both it and the condenser are upright or vertical. The refrigerant follows the usual cycle in the chiller, being compressed in the compressor 15, then led to the condenser 14 where it is condensed within the shell 22 outside the tubes 20, and from thence fed to the evaporator through an expansion valve 23. As shown, the several water and brine lines are valved so as to permit flow of fluid therethrough to be controlled or shut off, as desired.

In lieu of the usual electric motor drive and its relatively complex controls there is here employed an hydraulic drive 24 which serves to drive both the compressor 15 and the centrifugal pumps 16 and 18. The power for this drive is conveniently supplied by the main or auxiliary power unit 25 of the boat and is transmitted to an hydraulic pump 26 which, through a closed piping system 27, drives an hydraulic motor 28. Since of small size, the hydraulic pump 26 may either be mounted on the power unit 25 or separately, in either case being driven by a belt or like take-off. As usual in such hydraulic drive units, the one illustrated uses an oil reservoir 29 to maintain the unit filled and operating at maximum efficiency and also has a relief valve 30 for by-passing the motor 28. At the motor end of the unit the power is transmitted to the chiller either directly, as with the compressor, or through a belt drive as with the centrifugal pumps 16 and 18.

For holding the shrimp the above described refrigerating system operates most efficiently if the shrimp are headed before being placed in the tanks 2, there apparently being an aggravation of the enzyme action if the shrimp are left with their heads on. Within the tanks the shrimp are maintained at around freezing temperature (32° F.) and preferably at about 28° F., with a maximum of about 35° F. Under exceptional circumstances, such as if the main power plant should break down, shrimp have been found to keep without deterioration in brine at temperatures as high as 40° F., but for protracted periods the lower temperatures are necessary. Due to the continuous circulation of the brine through the system and multiple passes within the evaporator 13, a temperature gradient or differential of some 4° to 6° F. is sufficient to maintain the brine within the tanks 2 at the desired temperature. Thus, the temperature range of the refrigerant within the evaporator will be from 22° to 31° F., depending on the temperature at which the brine is to be maintained. Since exposed but a short time to the temperature of the refrigerant, and circulated during its exposure, the brine can have a freezing point several degrees above that of the refrigerant without freezing, this difference increasing with rapidity of circulation. Thus, it is possible to charge the tanks with raw sea water as the coolant. However, in most cases, and particularly where the preferred temperature of 28° F. is to be maintained, sufficient salt is added to lower the freezing point of the brine below that temperature. The use of brine as the coolant, in addition to its ready availability, has the advantage of having a high specific heat, closely approaching that of fresh water. This, and the insulation of the tanks, enables the brine, once chilled, to hold its cold for a prolonged period so that it takes several days, with the chiller inoperative, for the brine temperature to rise to the critical temperature of 40° F., thus ensuring preservation of the catch even during a breakdown of the unit by which it is powered. Other causes of failure are almost non-existent since the refrigerating system with its hydraulic drive is, itself, practically trouble-free.

It has been mentioned that the brine and sea water lines are appropriately valved. The illustrated valve arrangement serves both to blank out one or more of the tanks 2 when not in use and to permit the tanks to be filled with sea water at the start of a trip and emptied at its end. For filling, the normally open valve 31 from the intake 17 to the condenser 14 is shut off and the normally closed valve 32 to the centrifugal pump 16 of the evaporator is opened. Sea water is then pumped by the pump 16 through the evaporator into the tanks until the latter are substantially full. For emptying, the tanks may either be drained through the intake 17 with the chiller shut off or, by closing the intake valves 31 and 32 and the return valves 33 in the feed line to the several tanks and by opening the valve 34 between the valves 33 and the above water outlet 35 of the condenser 14, the brine can be pumped overboard by the pump 16.

For the moment, unloading by first draining the tanks and then removing their shrimp content through the unloading hatches 5, is preferred and in keeping with present methods of transporting shrimp from the docks to the processing plants by refrigerated trucks. As the brine tank system comes into wider usage it should be possible to employ tank trucks and pump the brine and shrimp directly from the hold of the boat to the truck. In such case, the tank of the truck, too, could be refrigerated for long hauls by a system such as here described.

From the above detailed description, it will be apparent that there has been provided an improved refrigerating system and method for fishing vessels which is particularly adapted for holding shrimp, can preserve the shrimp for protracted periods without spoilage, and is simple, efficient and practically trouble-free in operation. It should be understood that the described and disclosed embodiment is merely exemplary of the invention and that all modifications are intended to be included which do not depart either from the spirit of the invention or the scope of the appended claim.

Having described my invention, I claim:

A method of refrigerating the catch of a shrimp boat comprising initially chilling the shrimp by dumping it into an insulated tank substantially filled with brine chilled by circulation through a chiller exterior of said tank, and maintaining said brine at refrigerating temperature for storing said shrimp in said tank until unloaded from said boat by both driving said chiller and recirculating said brine hydraulically by hydraulic means driven off a power unit of said boat.

References Cited in the file of this patent

UNITED STATES PATENTS

| | | |
|---|---|---|
| 1,912,896 | Hiller | June 6, 1933 |
| 1,931,623 | Robertson | Oct. 24, 1933 |
| 1,947,327 | Brettell | Feb. 13, 1934 |
| 2,303,919 | Dobbs | Dec. 1, 1942 |
| 2,562,367 | Robinson | July 31, 1951 |
| 2,628,483 | Garnier | Feb. 17, 1953 |

FOREIGN PATENTS

| | | |
|---|---|---|
| 269,574 | Great Britain | Dec. 15, 1927 |